Nov. 9, 1965 H. CHIN 3,217,176

GATE CIRCUIT FOR PROVIDING INTEGRAL PULSES

Filed May 22, 1962

INVENTOR.
HENRY CHIN
BY John V. Regan
ATTORNEY

United States Patent Office 3,217,176
Patented Nov. 9, 1965

3,217,176

GATE CIRCUIT FOR PROVIDING INTEGRAL PULSES

Henry Chin, Burlington, Mass., assignor to Radio Corporation of America, a corporation of Delaware Filed May 22, 1962, Ser. No. 196,694
3 Claims. (Cl. 307—88.5)

This invention relates generally to gating circuits responsive to pulse signals, and in particular to gating circuits including bistable devices.

In applications such as quantization or counting in digital feedback or in control systems, for example, it is desirable to gate or to generate a number of pulses proportional to a preselected gating time. In practice, it is desirable that the gating system generates an integral number of pulses, that is, that the output pulses do not include a fraction of a pulse at either the beginning or at the end of the gating time.

Accordingly, it is one object of this invention to provide a gating circuit that generates an integral number of pulses under the control of a gate signal.

It is another object of this invention to provide a circuit that gates an integral number of pulses of an input pulse train under the control of a gating signal regardless of the time relationship between the beginning and the end of the gate signal and the pulses to be gated.

In accordance with the present invention, generally speaking, a triggerable switch having signal path input and output electrodes and a trigger electrode is coupled to a gate having input inhibit and output terminals so that signal current flowing through the current path is coupled to the input terminal of the gate. The output terminal of the gate is coupled to one input terminal of a bistable output circuit, which has another input terminal and an output terminal. An input pulse train is simultaneously applied to the trigger electrode of the switch, to the inhibit terminal of the gate, and to the other input terminal of the output circuit. A gate signal is applied to the input electrode of the triggerable switch so that the simultaneous application of a pulse of the input pulse train and the gate signal triggers the switch. When the input pulse simultaneously applied with the gate signal terminates, the gate is activated to apply a pulse of opposite phase to said input pulse to the output circuit, and the output circuit switches to its other stable state of operation. The triggerable switch remains conducting until the gating signal terminates regardless of the level of the signal applied to its trigger electrode. The following changes of signal level of the input pulse train open and close the gate and hence switch the output circuit from one of its stable operating states to the other until the gate signal terminates and the switch is turned off.

Figure 1:
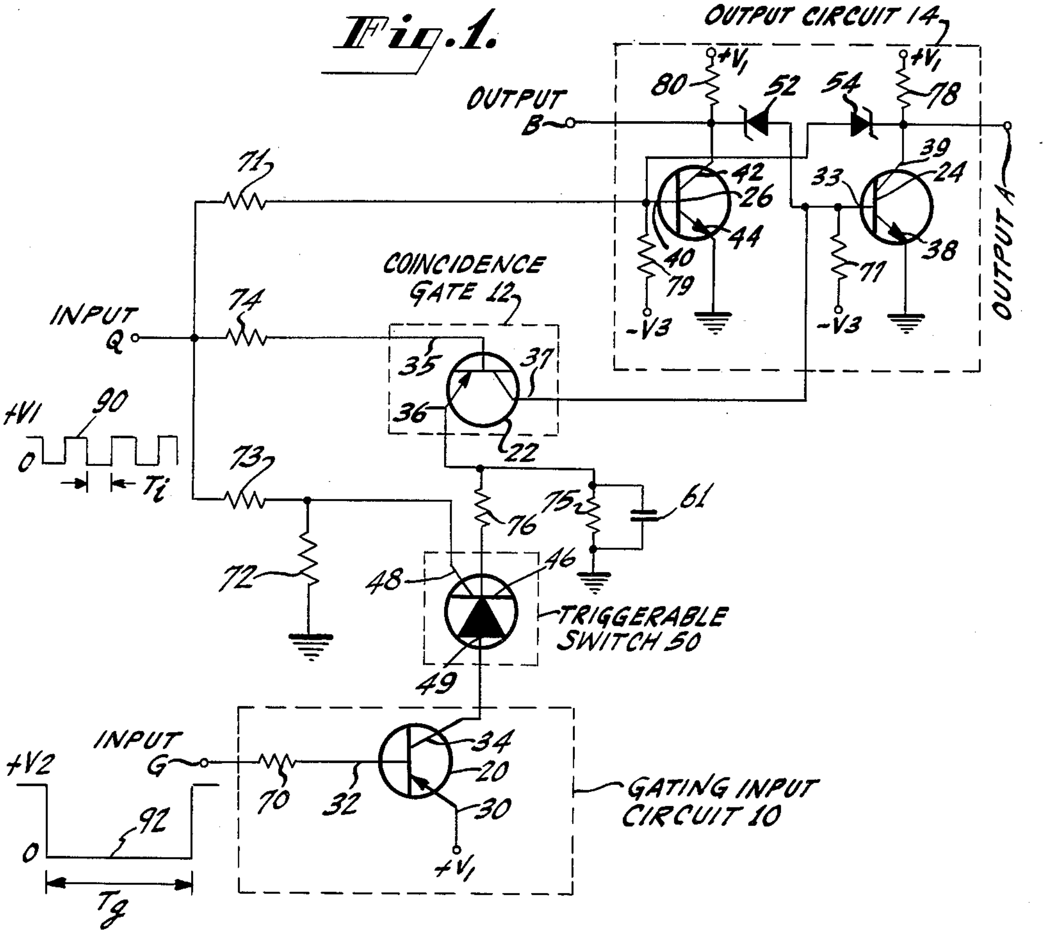

FIGURE 1 is a schematic diagram of an embodiment according to the present invention; and, FIGURE 2 is a timing diagram helpful in explaining the operation of the circuit shown in FIGURE 1.

In FIGURE 1, there is shown a triggerable switch, such as a silicon controlled rectifier 50 for example, which has current signal path electrodes such as the anode electrode 49 and the cathode electrode 46, and a trigger electrode such as gate electrode 48. A gate signal 92 is coupled through a gating input circuit 10 to the input electrode, also anode, 49 of switch 50.

The gating input circuit 10 comprises a transistor 20 biased normally to be non-conductive by means of a positive voltage $+V_2$ applied through resistor 70 to the base electrode 32. The emitter electrode 30 of transistor 20 is coupled to a bias potential $+V_1$ which has a lower voltage level than $+V_2$. The collector electrode 34 of transistor 20 is connected to the anode electrode 49 of rectifier 50.

An input pulse train 90 is applied to input terminal Q, which is coupled through resistor 73 to the gate electrode 48 of switch 50, and through resistor 74 to one of the input terminals of gate 12. The pulse train 90 is also coupled to an input terminal of a bistable output circuit such as flip-flop 14.

The gate 12 which may be a transistor 22, for example, is a gate having two input terminals constituted by an input emitter electrode 36 and an inhibit input or control base electrode 35. The emitter electrode 36 is coupled via resistor 76 to the cathode electrode 46 of the rectifier to provide a series current path with the anode-cathode signal path of the rectifier. When gate 12 is not operated, the signal path of the rectifier is completed through resistor 75 to a source of reference potential indicated in FIGURE 1 by the conventional ground symbol. A bypass capacitor 61 is connected across resistor 75. The discharge time of the capacitor 61 is small compared to the duration $T_1$ of each of the pulses of pulse train 90. Collector electrode 37 of transistor 22 constitutes the output terminal of gate 12 and is coupled directly to the input terminal of bistable output circuit 14 constituted by base electrode 33 of transistor 24.

The output circuit 14 is a bistable circuit having two stable states of operation and it may be a flip-flop. The output circuit 14 comprises two cross-coupled transistors 24 and 26. The respective base and collector electrodes are cross-coupled by Zener diodes 52 and 54. The collector electrodes 39 and 42 are coupled via resistors 78 and 80 to a source of bias potential $+V$. The emitter electrodes 38 and 44 of transistors 24 and 26, respectively, are coupled to ground. The output B of circuit 14 is coupled to collector 42. The output terminal A is coupled to collector 39. The base electrodes 33 and 40 of transistors 24 and 26, respectively, to are coupled through resistors 77 and 79, respectively, to a source of bias potential $-V_3$. Zener diodes 52 and 54 are poled in the easy direction of current flow from the bias source $-V_3$ to the bias source $V_1$.

Figure 2A:
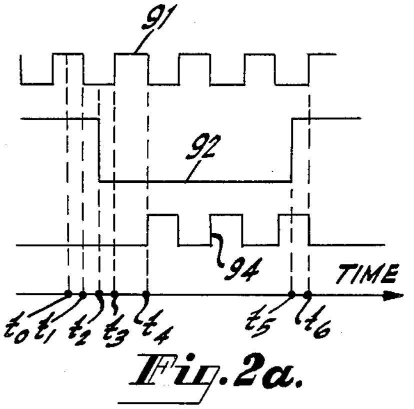
Figure 2B:
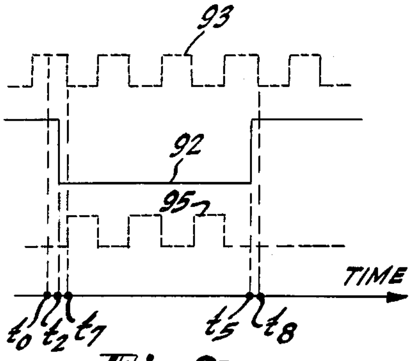

The timing diagrams of FIGURES 2*a* and 2*b* illustrate the operation of the system of FIGURE 1 for different phase relationships between the input pulse train 90 and the gate signal 92 shown in FIGURE 1. The output signal at terminal B has the waveform 94. The input pulses 90 are shown in FIGURE 2*a* as a solid wave 91 and as a dashed wave 93 in FIGURE 2*b*. Input pulse trains 91 and 93 have two signal levels $+V_1$ volts and zero volts, respectively, and a pulse width $T_1$ as illustrated in FIGURE 1. The gate signal 92 has two signal levels $+V_2$ volts and zero volts, respectively, and it has a pulse width $T_g$. The output signal derived at terminal B shown as pulse trains 94 and 95 in FIGURES 2*a* and 2*b*, respectively, comprises two signal levels, one representing a binary one and the other a binary zero.

Referring to FIGURE 2*a*, in operation, at an initial time $t_0$ a voltage $+V_2$ is applied to the input terminal G of the gating input circuit 10. The transistor 20 is non-conductive, its normal mode of operation, because a voltage $+V_2$ applied to its base electrode 32 is greater than the voltage $+V_1$ applied to its emitter electrode 30. Also, at a time $t_0$ the pulse train 91, applied to input Q, is at a level of $+V_1$ volts. The pulse train 91 is also simultaneously applied to an input terminal of gate 12 (base electrode 35), and to an input terminal of the output circuit 14 (base electrode 40). The level $+V_1$ of pulse train 91 biases gate transistor 22 to be non-conductive, and it biases flip-flop transistor 22 to be non-conductive, and it biases flip-flop transistor 26 to be conductive. The output signal of terminal B then is approximately at ground potential, say zero volts, which is arbitrarily chosen to represent a binary zero.

At the time $t_1$, the voltage $+V_2$ remains applied to the input G of the gating input circuit 10, so that the gating input circuit 10 and the switch 50 remain non-conductive. The pulse train 91 changes at $T_1$ from $V_1$ to zero volt level, but this change in voltage is not enough to render gate transistor 22 conductive. Transistor 26 remains in its conductive state, even though the voltage applied to its base electrode 40 is reduced to a value near zero volts.

At a time $t_2$, the gate signal 92 is applied to input G, that is, the level of input G decreases to a value of zero volts, and transistor 20 is forward biased. Transistor 20 does not conduct, however, because the switch 50 remains open (non-conductive) as long as the signal applied to its gate electrode 48 remains at the zero volt level.

At a time $t_3$, the input pulse train 91 changes to a level of $+V_1$ volts and it triggers switch 50 into conduction. The control signal or current flowing through the rectifier 50 does not flow into the emitter 36 of transistor 22, but flows through resistor 75 to ground because the level $+V_1$ of the input pulse train 91 maintains transistor 22 in a non-conductive state.

At a time $t_4$, the gate electrode 48 of switch 50 is biased to zero volts. The control rectifier 50, which operates in a similar fashion to a thyratron, remains conducting, but switch transistor 22 is now rendered conductive and the current flowing through switch 50 now flows into the emitter 36 of transistor 22. The current flowing through switch transistor 22 is now applied to the base electrode 33 of transistor 24. Transistor 24, which at a time prior to a time $t_4$ was non-conductive, starts to conduct. Simultaneously, the voltage applied to the base electrode 40 tends to render transistor 26 non-conductive. As transistor 24 begins to conduct, the voltage at the collector electrode 39 of transistor 24 decreases toward zero rendering the Zener diode 54 non-conductive, which in turn applies a voltage $-V_3$ at the base electrode 40 of transistor 26 rendering transistor 26 non-conductive. The voltage at the collector electrode 42 of transistor 26 rises towards $+V$, which in turn renders Zener diode 52 conductive, and which increases the conduction of transistor 24. The output signal at the terminal B of the output circuit 14 goes positive, to a value that represents a binary one, as shown by the wave 94 of FIGURE 2.

Each following change in signal level in the input pulse train 91 produces a change in level in the output signal at the output terminal B of output circuit 14 until a time $t_5$ when the gate signal 92 terminates. At the time $t_5$, flip-flop transistor 26 is non-conducting and the output at terminal B represents a binary one. Flip-flop transistor 24 is conducting and it remains conducting even when the gating input circuit and the switch 50 are rendered non-conductive by the termination of the gate signal 92. At time $t_6$, when the input pulse train 91 changes to a level $+V_1$, transistor 24 cuts off and switches the output circuit 14 switches to the other stable state of operation.

Referring to FIGURE 2*b*, the controlled rectifier of switch 50 is triggered into conduction at a time $t_2$ and the output circuit switches to the other of its two stable states at a time $t_7$. Each change in level of the input signal 93 between times $t_7$ and $t_5$ switches the output circuit 14. At the time $t_5$, the gate signal terminates, the switch 50 is rendered non-conducting as is gate transistor 22. At a time $t_8$, the input pulse train 93 has a level of zero volts, but transistor 22 is not biased into conduction because its emitter electrode 36 is also at zero volts, so that the output circuit 14 remains in the same stable state of operation.

The modes of operation described are by way of example only, and although the phase relationship between the input pulse train and the gate signal may differ, the output at terminal B (or at terminal A) of the output circuit 14 generates an integral number of pulses for any phase relationship.

What is claimed is:

1. The combination of means for gating an integral number of pulses in a sequence of input pulses having first and second levels under the control of a gating signal comprising,
   - switch means activated by said gating signal and said sequence of input pulses for producing a control signal starting with the first occurrence of the first level of said input pulses and extending for the remaining duration of said gate signal,
   - gate means coupled to receive said control signal and said sequence of input pulses for producing a sequence of control pulses of opposite phase to said input pulses starting with the first occurrence of the second level of said input pulses and extending for the remaining duration of said gate signal, and
   - bistable circuit means coupled to be set by said input pulses and reset by said control pulses to produce an integral number of output pulses of the same period as said input pulses.

2. A gating system for generating under the control of a gate signal an integral number of pulses, comprising,
   - a controlled rectifier having signal input and output electrodes and a trigger electrode,
   - a gate having input, inhibit, and output terminals, said input terminal being coupled to said rectifier output electrode,
   - means coupling said gate signal to the signal input electrode of said rectifier,
   - means coupling an input pulse train wave having first and second levels to said rectifier trigger electrode to render said rectifier operative for a time starting with the first simultaneous occurrence of the said first level of said input pulse train and said gating signal and extending for the duration of said gate signal,
   - means coupling said input pulse train to said inhibit terminal of said gate, said gate conducting whenever said input pulse train is at said second level and said gate signal is present at said input terminal,
   - a flip-flop having set and reset input terminals and an output terminal,
   - means to apply said input pulse train to said set terminal to switch said flip-flop to its set state,
   - means to apply the output of said gate to said reset input terminal to switch said flip-flop to its reset state,
   - and means to derive an integral number of pulses from said output terminal of said flip-flop.

3. The combination comprising,
   - a controlled rectifier having an input electrode, an output electrode and a trigger electrode,
   - a gate having an input terminal coupled to said output electrode and having a control terminal and an output terminal,
   - means for applying a gate signal to said input electrode of said controlled rectifier,
   - means for coupling an input pulse train wave having first and second levels to said trigger electrode of said rectifier to trigger said rectifier into conduction for a time starting with the first simultaneous occurrence of said first level of said pulse train said gating signal and ending with the termination of said gate signal, means for coupling said input pulse train wave also to the control terminal of said gate in a manner tending to render said gate conductive whenever said pulse train wave is at said second level, and means to derive from said output terminal of said gate an output train wave of opposite phase to said input pulse train.

References Cited by the Examiner

FOREIGN PATENTS 611,460 12/60 Canada.

OTHER REFERENCES

New Design Ideas, Solid State Products, Inc., (SSPI), 2 pages, July 11, 1961.

JOHN W. HUCKERT, *Primary Examiner.*